(12) United States Patent
Wada et al.

(10) Patent No.: US 10,011,313 B2
(45) Date of Patent: Jul. 3, 2018

(54) TANDEM GRIP UNIT FOR MOTORCYCLE

(71) Applicant: Kawasaki Jukogyo Kabushiki Kaisha, Kobe-shi, Hyoho (JP)

(72) Inventors: Hiroyuki Wada, Kobe (JP); Takahiro Kokubo, Kobe (JP); Kaoru Kouchi, Kakogawa (JP); Hidefumi Yasuhara, Irvine, CA (US)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/271,445

(22) Filed: Sep. 21, 2016

(65) Prior Publication Data

US 2017/0008585 A1    Jan. 12, 2017

Related U.S. Application Data

(63) Continuation of application No. PCT/JP2015/053053, filed on Feb. 4, 2015.

(30) Foreign Application Priority Data

Mar. 31, 2014 (JP) .................................. 2014-071997

(51) Int. Cl.
  *B62J 9/00* (2006.01)
  *B62J 7/04* (2006.01)
(52) U.S. Cl.
  CPC ..... *B62J 9/001* (2013.01); *B62J 7/04* (2013.01)
(58) Field of Classification Search
  CPC .................................... B62J 7/04; B62J 9/001
  See application file for complete search history.

(56) References Cited

U.S. PATENT DOCUMENTS

| 4,480,773 | A  | * | 11/1984 | Krauser | B62J 7/00 |
|           |    |   |         |         | 211/150 |
| 8,882,128 | B2 | * | 11/2014 | Komatsu | B62J 7/04 |
|           |    |   |         |         | 180/219 |
| 8,985,416 | B2 | * | 3/2015  | Schanz  | B62J 9/001 |
|           |    |   |         |         | 224/413 |
| 9,045,187 | B2 |   | 6/2015  | Komatsu et al. | |
| 2008/0174099 | A1 | | 7/2008 | Brown | |
| 2010/0243691 | A1 | * | 9/2010 | Salisbury | B62J 1/12 |
|           |    |   |         |         | 224/413 |

(Continued)

FOREIGN PATENT DOCUMENTS

| DE | 102006046005 | 4/2007 |
| EP | 0709281 | 5/1996 |

(Continued)

OTHER PUBLICATIONS

English Language Translation of the International Preliminary Report on Patentability dated Oct. 13, 2016 for PCT/JP2015/053053 (9 pages).

(Continued)

*Primary Examiner* — Kevin Hurley

(57) ABSTRACT

A tandem grip unit includes a pair of left and right tandem grips. Each of the tandem grips in turn includes a to-be-supported portion supported by a vehicle frame structure, a grip portion to be grasped by a fellow passenger, a bag fitting portion to which a pannier bag is fitted, and a casing fitting portion to which a top casing is fitted, all of those elements being formed integrally.

8 Claims, 7 Drawing Sheets

(56) References Cited

U.S. PATENT DOCUMENTS

2013/0320719 A1   12/2013   Komatsu et al.
2014/0167387 A1    6/2014   Komatsu et al.

FOREIGN PATENT DOCUMENTS

| | | | |
|---|---|---|---|
| EP | 0985599 | 3/2000 | |
| EP | 2574348 A1 * | 4/2013 | ............ A01N 25/34 |
| EP | 2574534 | 4/2013 | |
| EP | 2783955 | 10/2014 | |
| GB | 2379431 | 3/2003 | |
| JP | 62-122790 | 8/1987 | |
| JP | 04-123988 | 4/1992 | |
| JP | 2006-103647 | 4/2006 | |
| JP | 2012-201238 | 3/2011 | |
| JP | 2013018410 A * | 1/2013 | |
| JP | 2013-075552 | 4/2013 | |
| JP | 2013-248980 | 12/2013 | |

OTHER PUBLICATIONS

International Search Report for PCT/JP2015/053053, filed Feb. 4, 2015 (4 pages).
Notification of Reason(s) for Rejection dated Oct. 17, 2017 for Corresponding Japanese Patent Application No. 2014-071997 and English Language Summary (4 pages).
Extended and Supplementary Search Report dated Dec. 12, 2017 for Corresponding European Patent Application No. 15772351.1 and English Language Summary (10 pages).

* cited by examiner

TANDEM GRIP UNIT FOR MOTORCYCLE

CROSS REFERENCE TO THE RELATED APPLICATION

This application is a continuation application, under 35 U.S.C § 111(a) of international patent application No. PCT/JP2015/053053, filed Feb. 4, 2015, which claims priority to Japanese patent application No. 2014-071997, filed Mar. 31, 2014, the entire disclosure of which is herein incorporated by reference as a part of this application.

BACKGROUND OF THE INVENTION

Field of the Invention

The present invention relates to a tandem grip unit adapted to be mounted on a motorcycle in which a pair of pannier bags for accommodating an article therein removably fitted respectively to left and right sides of a vehicle rear portion, and a top casing for accommodating an article therein is also removably mounted on an upper portion of the vehicle rear portion, the tandem grip unit including a pair of left and right grips that are held by a fellow passenger.

Description of Related Art

The use of a pair of left and right tandem grips, which are held by a fellow passenger, beneath a fellow passenger's seat on a rear portion of the motorcycle has been well known in the art. The tandem grips are generally supported by a rear portion of a motorcycle frame structure. In this connection, see, for example, the patent document 1 listed below.

PRIOR ART LITERATURE

Patent Document: JP Laid-Open Utility Model Publication No. S62-122790

On the other hand, in a motorcycle of a type, in which pannier bags for accommodating an article therein are removably fitted respectively to left and right sides of a vehicle body rear portion or a top casing for accommodating an article therein is removably fitted to an upper portion of the vehicle body rear portion, those pannier bags or the top casing are/is also supported by a rear portion of a motorcycle frame structure. For this reason, the rear portion of the motorcycle frame structure tends to become complicated in structure.

SUMMARY OF THE INVENTION

In view of the foregoing, it is an object of the present invention to provide a tandem grip unit of a structure that allows the pannier bags or the top case can be fitted without incurring complication of a rear portion structure of the motorcycle frame structure.

In order to accomplish the foregoing object of the present invention, a tandem grip unit of the present invention is applicable to a motorcycle including pair of left and right pannier bags for accommodating an article therein, removably fitted to left and right sides of a vehicle rear portion, respectively, and a top casing for accommodating another article therein removably fitted to an upper portion of the vehicle rear portion. The tandem grip unit referred to above includes a pair of left and right tandem grips which are held by a fellow passenger. Each of the tandem grips is a one-piece molded article including: a to-be-supported portion which is supported by a vehicle frame structure; a grip portion to be gripped by the fellow passenger; a bag fitting portion to which the respective pannier bag is fitted; and a casing fitting portion to which the top casing is fitted.

According to the above described construction, each of the left and right tandem grips includes the to-be-supported portion supported by the vehicle frame, the grip portion to be grasped by the fellow passenger, the bag fitting portion to which the corresponding pannier bag is fitted, and the casing fitting portion to which the top casing is fitted, and all of those elements are formed integrally. Accordingly, without rendering a rear structure of the vehicle frame to be complicated, the pannier bag and the top casing can be fitted to the vehicle body. Also, integral formation of the to-be-supported portion, the grip portion, the bag fitting portion and the casing fitting portion can reduce the number of component parts used and, also, the tandem grip unit is increased in size to thereby increase the rigidity. As a result, the pannier bags and the top casing can be supported stably.

In the practice of one preferred embodiment of the present invention, the tandem grip unit may also include a rope hook engageable with a luggage fastening rope, which hook is also formed integrally. According to this construction, since the rope hook is also formed integrally by means of a molding technique, the number of components used can be further reduced. Also, by the tandem grip unit of a large size, the luggage fastening member and a luggage can be supported stably.

In the practice of another preferred embodiment of the present invention, the casing fitting portion preferably includes a boss provided in a rear end portion of the tandem grip, in which case the tandem grip unit further includes an elongated casing stay, extending in an anteroposterior or longitudinal direction of the motorcycle, to support the top casing, the elongated casing stay being removably fitted to the boss. According to this construction, the casing fitting portion can be reduced in size, and also, where no top casing is mounted, removal of the casing stay makes it possible to improve the look of a vehicle rear portion.

In the practice of a further preferred embodiment of the present invention, each of the tandem grips may include: a base portion of an elongated shape having a lengthwise direction in an anteroposterior direction of the motorcycle; a top portion disposed above the base portion and elongated in the anteroposterior direction; and a pair of connecting portion spaced in the anteroposterior direction and configured to extend upwardly from anteroposterior opposite end portions of the base portion to connect the anteroposterior opposite end portions of the base portion with an anteroposterior opposite end portions of the top portion, in which case the to-be-supported portion is preferably formed in a surface of the base portion facing inwardly of a vehicle body, the bag fitting portion is preferably formed in a surface of the base portion facing outwardly of the vehicle body, the grip portion is preferably defined by a portion of the top portion between the pair of connecting portions, and the casing fitting portion is preferably formed in a rear end portion of the top portion. According to this construction, a space can be formed below the grip portion and between the pair of the connecting portions. Thanks to this space, the fellow passenger can easily grasp the grip portion and the tandem grip unit can have a reduced weight.

Where the to-be-supported portion is formed in the base portion, the to-be-supported may include: a first and second to-be-supported segments to defined in front and rear end portions of the surface of the base portion casing inwardly of the vehicle body, respectively; and a third to-be-supported segment provided in an anteroposterior direction intermediate portion of the base portion, in which case the first and second to-be-supported segments are preferably fixed from a vertical direction by a bolt, and the third to-be-supported segment is fixed from a vehicle widthwise direction by a bolt. According to this construction, by rendering the direction of fitting of the tandem grip unit onto the vehicle frame to be in the vehicle widthwise direction and the vertical direction, application becomes possible to a variety of types of motorcycle.

Where the to-be-supported portion includes the first to third to-be-supported segments referred to above, the vehicle frame structure may include a main frame forming a front half portion and a rear frame forming a rear half portion, in which case, the rear frame preferably includes: a pair of left and right rear frame pieces; a rear end cross member to connect respective rear end portions of the pair of the rear frame pieces; and an intermediate cross member to connect the pair of the rear frame pieces at a location forwardly of the rear end cross member. In this case, a first boss to support the first to-be-supported segment is preferably provided at a location forwardly of the intermediate cross member in the rear frame, a second boss to support the second to-be-supported segment is preferably provided in the vicinity of the rear end cross member in the rear frame, and a third boss to support the third to-be-supported segment is preferably provided laterally outwardly of the intermediate cross member in the rear frame.

According to the above described construction, the second boss is provided in the vicinity of the rear end cross member and the third boss is provided laterally outwardly of the intermediate cross member. Accordingly, since the rigidity of each of the second and third bosses is increased, the support of the second and third to-be-supported segments takes place stably.

In another aspect of the present invention, there is provided a motorcycle which includes the tandem grip unit of the present invention and a tail covering to cover the vehicle frame from lateral outside, the tail covering being removably fitted to a rear end portion of the vehicle frame, in which case, the grip portion and the bag fitting portion in each of the tandem grips are exposed to the outside from the tail covering, whereas the remaining portion other than each of the tandem grip is covered from the lateral outside by the tail covering.

According to the construction described hereinabove, a portion of the tandem grip unit, for example, the to-be-supported portion can be concealed by the tail covering. Accordingly, the outer appearance of the vehicle rear portion is increased and, also, since the to-be-supported portion does not represents a design feature that may be exposed to the outside, the cost of manufacture of the tandem grip unit can be reduced. Also, since the tail covering is detachable, it is possible to form the to-be-supported portion as a design component and to provide a model in which the tail covering can be removed. Thereby, the degree of freedom in designing can be increased.

Another motorcycle herein provided in accordance with the present invention includes: the tandem grip unit of the present invention; the pannier bag fitted to each to the tandem grips; a casing stay fitted to each of the pair of the casing fitting portions; a support plate fitted between the pair of the casing stays; and the top casing supported by the support plate. Accordingly, without rendering the rear structure of the vehicle frame of the motorcycle to be complicated, the pannier bags and the top casing can be fitted.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
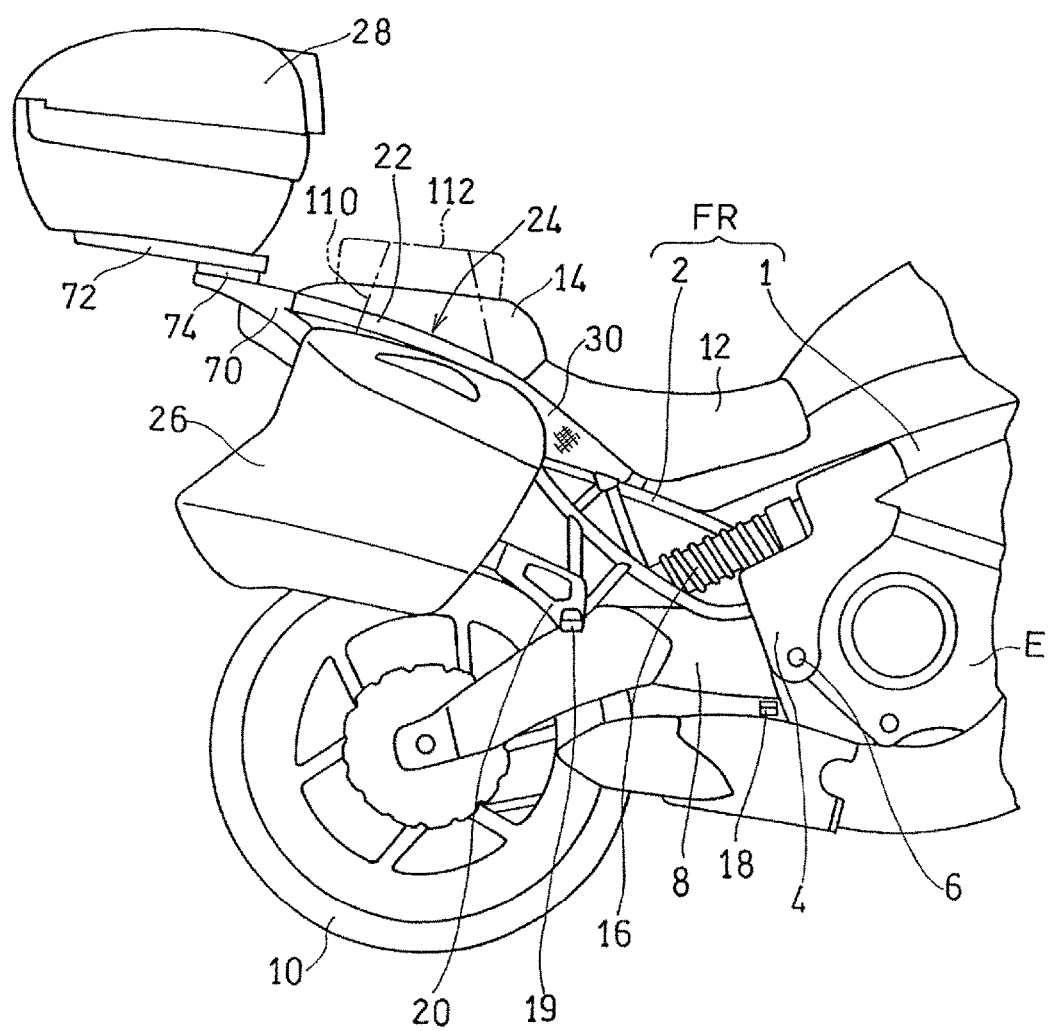
FIG. 1 is a fragmentary side view showing a rear portion of a motorcycle equipped with a tandem grip unit designed in accordance with a preferred embodiment of the present invention.

Hereinafter a preferred embodiment of the present invention will be described in detail with particular reference to the accompanying drawings. In describing the present invention, however, the term "leftward and rightward direction" used hereinabove and hereinafter are to be understood as the relative term descriptive of leftward and rightward positions and/or direction as viewed from a driver maneuvering a motorcycle. FIG. 1 illustrates a fragmentary side view showing a rear portion of the motorcycle equipped with a tandem grip unit designed in accordance with the preferred embodiment of the present invention. The motorcycle includes a vehicle frame structure FR having a main frame 1, forming a front half portion thereof and a rear frame 2 connected with a rear portion of the main frame 1 and forming a rear half portion thereof. A front wheel (not shown) is supported by a front end portion of the main frame 1 through a front fork (not shown).

A swingarm bracket 4 is provided at a rear end lower portion of the main frame 1, and a swingarm 8 is supported by the swingarm bracket 4 for vertical movement through a pivot pin 6 at a front end portion of the swingarm 8. The swingarm 8 has a rear end portion by which a rear wheel 10 is supported. A combustion engine E is supported by a center lower portion of the main frame 1, and the rear wheel 10 referred to above is driven by this combustion engine E. The combustion engine E is employed in the form of, for example, a parallel multi-cylinder four cycle engine.

A rider's seat 12 and a fellow passenger's seat 14 are supported by the rear frame 2. Beneath the rider's seat 14, a single rear wheel suspension device 16 connected between the main frame 1 and the swingarm 8 is disposed so as to extend substantially in the anteroposterior direction, i.e., a longitudinal direction of the motorcycle. Below the rider's seat 12, a first footstep 18, which is a rider's foot rest, is disposed in the rear frame 2. At a location rearwardly of the first footstep 18, a step stay 20 for supporting a second footstep 19, which is a fellow passenger's foot rest, is fitted to the rear frame 2. Both of the footsteps 18, 19 and the step stay 20 are provided in a pair on left and right sides.

Below the fellow passenger's seat 14 in the rear frame 2, a tandem grip unit 24, including a pair of left and right tandem grips 22 that are to be gripped by the fellow passenger, is fitted. Pannier bags 26 for accommodating an article therein are disposed on left and right sides of the vehicle body rear portion and are removably fitted to the rear frame 2 through the tandem grip unit 24. A top casing 28 for accommodating an article therein is disposed on a top portion of a vehicle body rear end and is removably fitted to the rear frame 2 through the tandem grip unit 24. The top casing 28 is fitted to the tandem grip unit 24 through a casing stay 70 and a support plate 72, both of which will be described in detail later. Also, a tail covering 30 made of a resinous material and used for covering the rear frame 2 from outside is supported by a read end portion of the rear frame 2.

Figure 2:
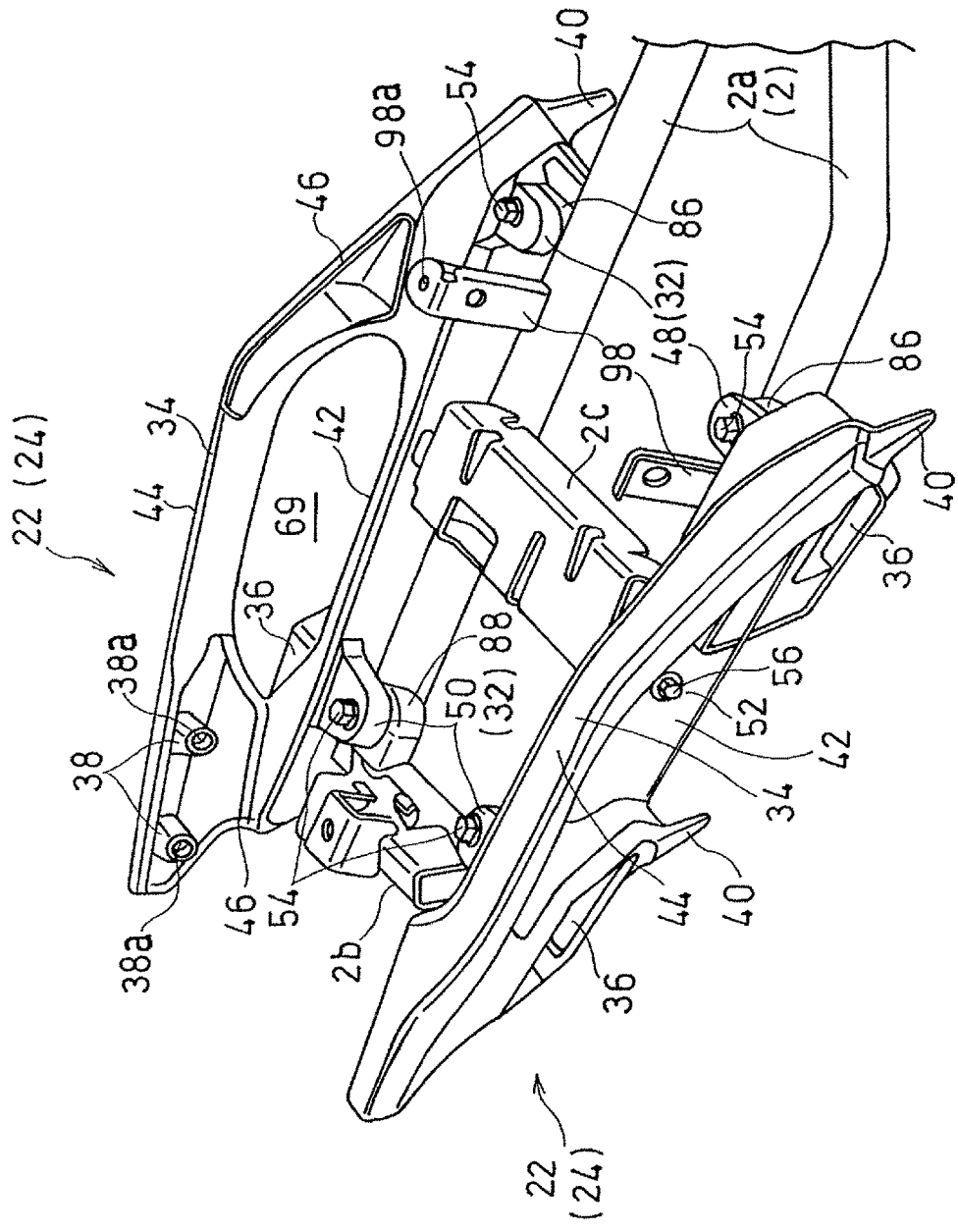
FIG. 2 is a perspective view showing the tandem grip unit shown as fitted to a vehicle frame.
Figure 3:
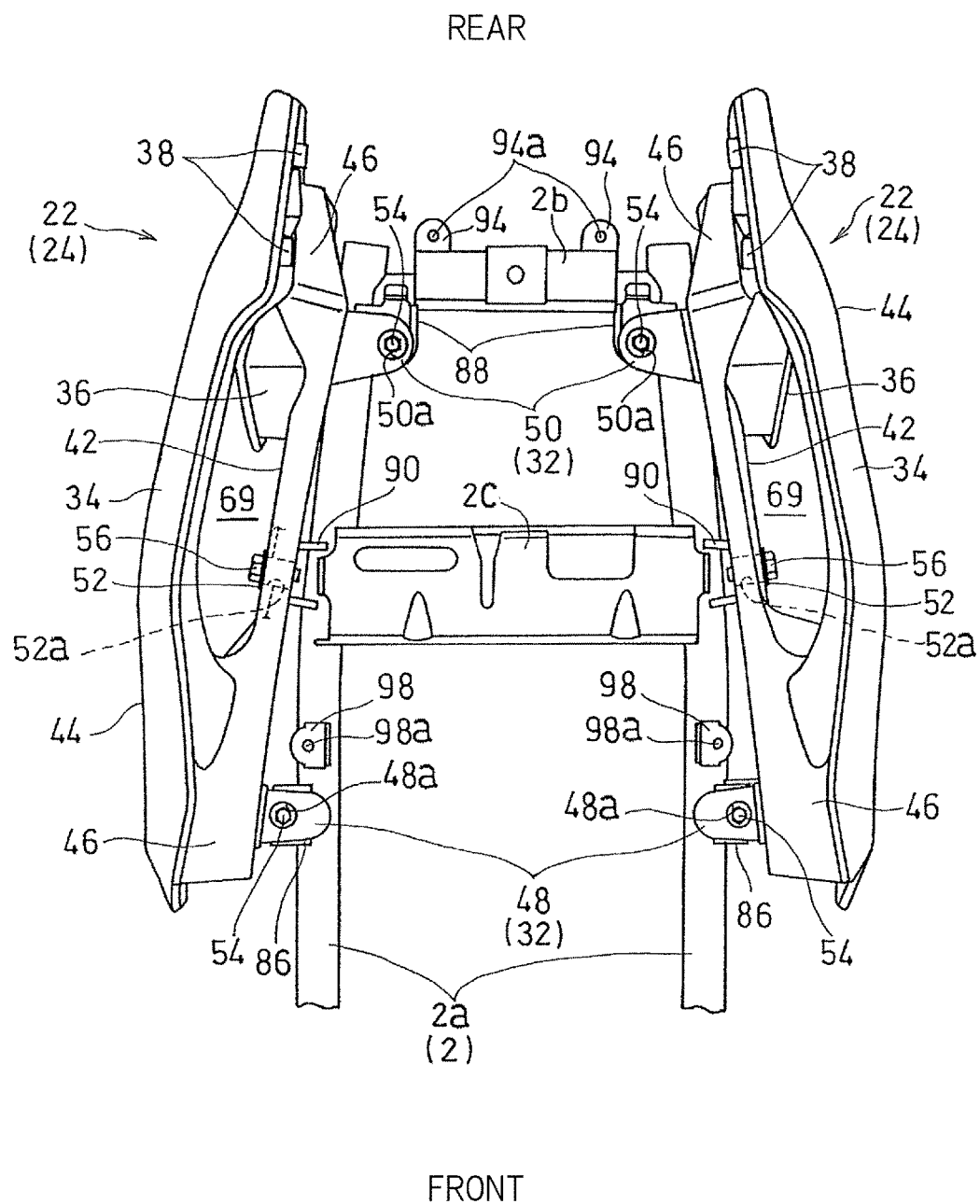
FIG. 3 is a top plan view of FIG. 2.

FIG. 2 is a perspective view showing the tandem grip unit as fitted to the rear frame 2, viewed from above in a diagonally forward direction, and FIG. 3 is a top plan view thereof. The rear frame 2 includes: a pair of left and right rear frame pieces 2a and 2a; a rear end cross member 2b joined to respective rear end portions of the left and right rear frame pieces 2a and 2a to connect the left and right rear frame pieces 2a and 2a together; and an intermediate cross member 2c for connecting the rear frame pieces 2a and 2a together at a front portion of the rear end cross member 2b. The left and right tandem grips 22 and 22 of the tandem grip unit 24 are of a symmetrical structure with respect to a leftward and rightward direction or a vehicle widthwise direction. In the practice of the preferred embodiment of the present invention, each of the tandem grips 22 is in the form of an aluminum die cast.

As shown in FIG. 2, each of the tandem grips 22 is a one-piece molded article including: a to-be-supported portion 32 that is supported by the rear frame 2; a grip portion 34 that is to be grasped by the fellow passenger; a bag fitting portion 36 to which the respective pannier bag 26 (best shown in FIG. 1) is fitted, a casing fitting portion 38 to which the top casing 28 (best shown in FIG. 1) is fitted; and a rope hook 40 around which a luggage fastening rope is engaged.

More specifically, each of the tandem grips 22 includes: a base portion 42 of an elongated shape having its lengthwise direction in the anteroposterior direction; a top portion 44 disposed above the base portion 42 and extending in the anteroposterior direction; and a pair of connecting portions 46 extending upwardly from anteroposterior opposite end portions of the base portion 42, while being spaced a distance from each other in the anteroposterior direction, to connect the anteroposterior opposite end portions of the base portion 42 and anteroposterior opposite end portions of the top portion 44 with each other. In other words, each tandem grip 22 is formed with a space 69 elongated in the anteroposterior direction while being opened in the vehicle widthwise direction, which space 69 is bound by the base portion 42, the top portion 44 and the front and rear connecting portions 46 and 46.

In a surface of the base portion 42 which faces inwardly of a vehicle body, the to-be-supported portion 32 is formed. The to-be-supported portion 32 includes: a first and second to-be-supported segments 48 and 50 which are provided in a front end portion and a rear end portion of that surface of the base portion 42 each end portion facing inwardly of the vehicle body, and a third to-be-supported segment 52 provided in a portion of the base portion 42 which is located intermediate in the anteroposterior direction. The first and second to-be-supported portions 48 and 50 are fixed with the use of bolts 54 from the vertical direction, i.e., so as to extend in the vertical direction, whereas the third to-be-supported 52 is fixed with the use of bolts 56 from the vehicle widthwise direction.

More specifically, the first to-be-supported segment 48 is, as best shown in FIG. 3, in the form of a first fitting piece 48 protruding from the front end portion of the surface of the base portion 42, which faces inwardly of the vehicle body, in a direction inwardly of the vehicle body. This first fitting piece 48 is formed with a vertically oriented throughhole 48a. The second to-be-supported segment 50 is in the form of a second fitting piece 50 protruding from the rear end portion of the surface of the base portion 42, which faces inwardly of the vehicle body, in a direction inwardly of the vehicle body. This second fitting piece 50 is also formed with a vertically oriented throughhole 50a. The third to-be-supported segment 52 is in the form of a boss provided in the portion of the anteroposterior direction intermediate portion of the base portion 42. A bolt insertion hole 52a oriented in the vehicle widthwise direction is formed in this boss 52. The third to-be-supported segment 52 is provided in the surface of the base portion 42, which faces inwardly of the vehicle body, so as to protrude inwardly.

As shown in FIG. 2, on a surface of the base portion 42 facing outwardly of the vehicle body, the bag fitting portion 36 is formed. The bag fitting portion 36 is provided at a front end portion and a rear end portion of the surface of the base portion 42 which faces outwardly of the vehicle body and is in the form of a bottomed recess depressed inwardly of the vehicle body. The bag fitting portion 36 referred to above is of a type that is designed in accord with the structure of a to-be-fitted portion of the pannier bag 26 (best shown in FIG. 1) and, accordingly, the bag fitting portion 36 is not specifically designed and configured in the practice of the embodiment of the present invention now under discussion.

A portion between the front and rear connecting portions 46 and 46 in the top portion 44 of the tandem grip 22 constitute the grip portion 34 referred to previously. A rear end portion of the top portion 44 is formed with the casing fitting portion 38. The casing fitting portion 38 is in the form of a boss extending from an inner side face of the rear end portion of the top portion 44 in a direction inwardly of the vehicle body. This casing fitting portion 38 is, in the practice of the embodiment now under discussion, provided two in number with those casing fitting portions 38 being juxtaposed in the anteroposterior direction. Each of the bosses 38 is formed with a helically threaded hole 38a that is oriented inwardly of the vehicle body. The rope hook 40 referred to previously is provided at a front end portion and a rear end portion of the base portion 42 and is in the form of a projecting body 40 protruding from an undersurface of the base portion 42 in a direction downwardly.

Figure 4:
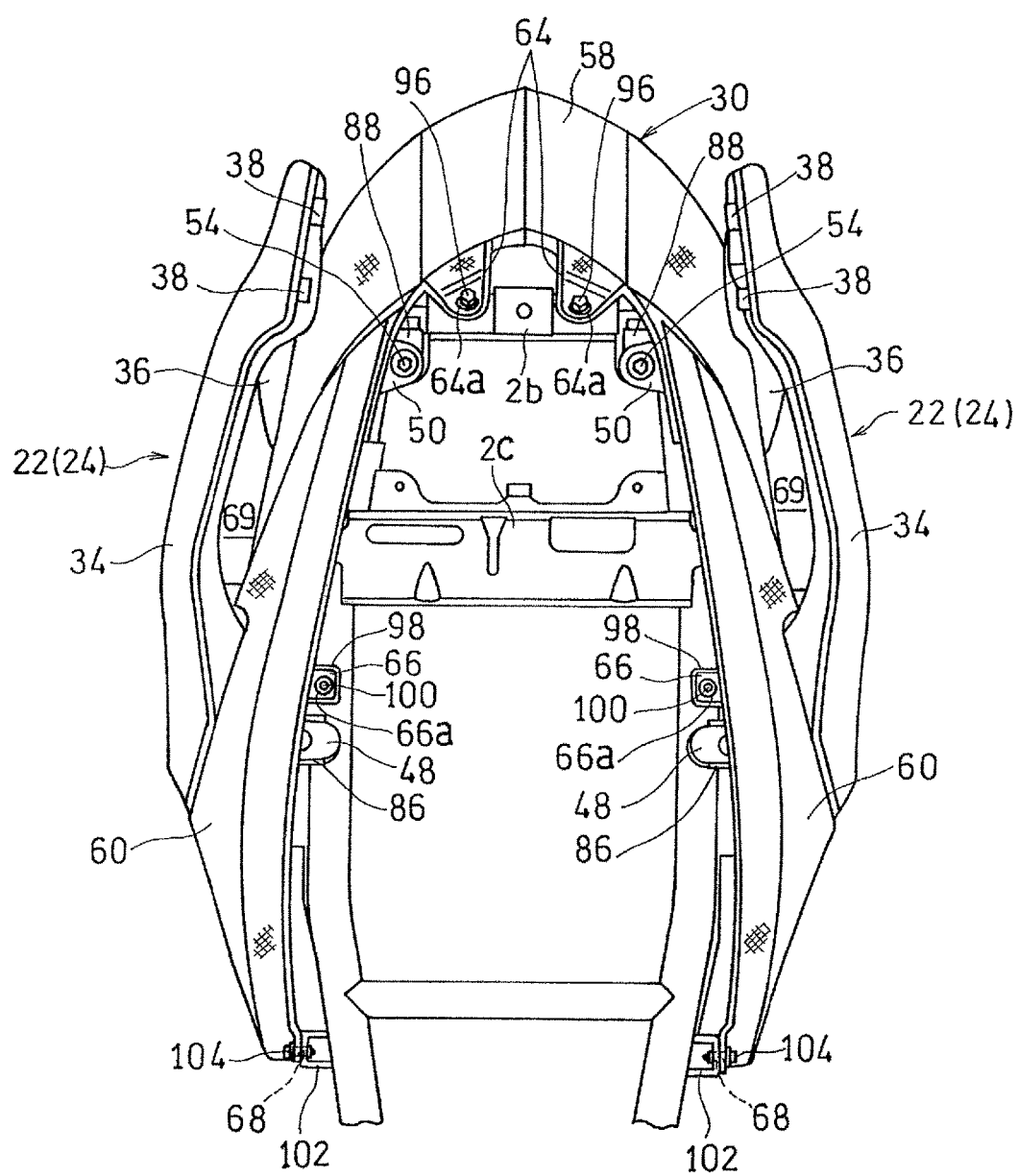
FIG. 4 is a top plan view showing the tandem grip unit with a tail covering fitted to the top plan view of FIG. 3.

FIG. 4 is a top plan view of the tandem grip unit with a casing stay fitted to FIG. 3. The tail covering 30 referred to previously includes: a U-shaped covering rear portion 58, that opens forwardly to cover the rear end portion of the vehicle frame structure FR; and a pair of left and right covering side portions 60 and 60 which are connected respectively with two branch portion of the U-shaped covering rear portion 58 so as to extend in the anteroposterior direction. For the sake of clarity, the tail covering 30 is shown as cross hatched. The covering rear portion 58 and the covering side portions 60 and 60 are all a molded articles made of a resinous material and are connected by means of bolts 62 shown in FIG. 7. Specifically, each of the covering side portions 60 and 60 is connected with the covering rear portion 58 at two locations that are juxtaposed in the anteroposterior direction.

The covering rear portion 58 covers an area upwardly of the rear end portion of the rear frame 2 and each of the covering side portions 60 covers an area laterally outside of the rear frame 2 and the to-be-supported portion 32 of the tandem grip 22. In other words, the grip portion 34 of each of the tandem grips 22, the bag fitting portion 36 and the rope hook 40 are exposed from the tail covering 30 to the outside.

The covering rear portion 58 of the tail covering 30 shown in FIG. 4 has a rear portion fitting piece 64 protruding from a front edge of a base portion thereof in a direction forwardly. The rear portion fitting piece 64 is employed two in number with those fitting pieces 64 being disposed one on each side of the vehicle body with respect to the left and right direction. Each of those rear portion fitting pieces 64 is formed with a bolt insertion hole 64a that is oriented in the vertical direction. Each of the covering side portions 60 has the anteroposterior direction intermediate portion formed with an intermediate fitting piece 66 that protrudes inwardly of the vehicle body. A bolt insertion hole 66a oriented in the vertical direction is formed in the intermediate portion fitting piece 66. Also, each of the covering side portions 60 has a front end portion formed with a bolt insertion hole 68 that is oriented in the vehicle widthwise direction.

Figure 5:
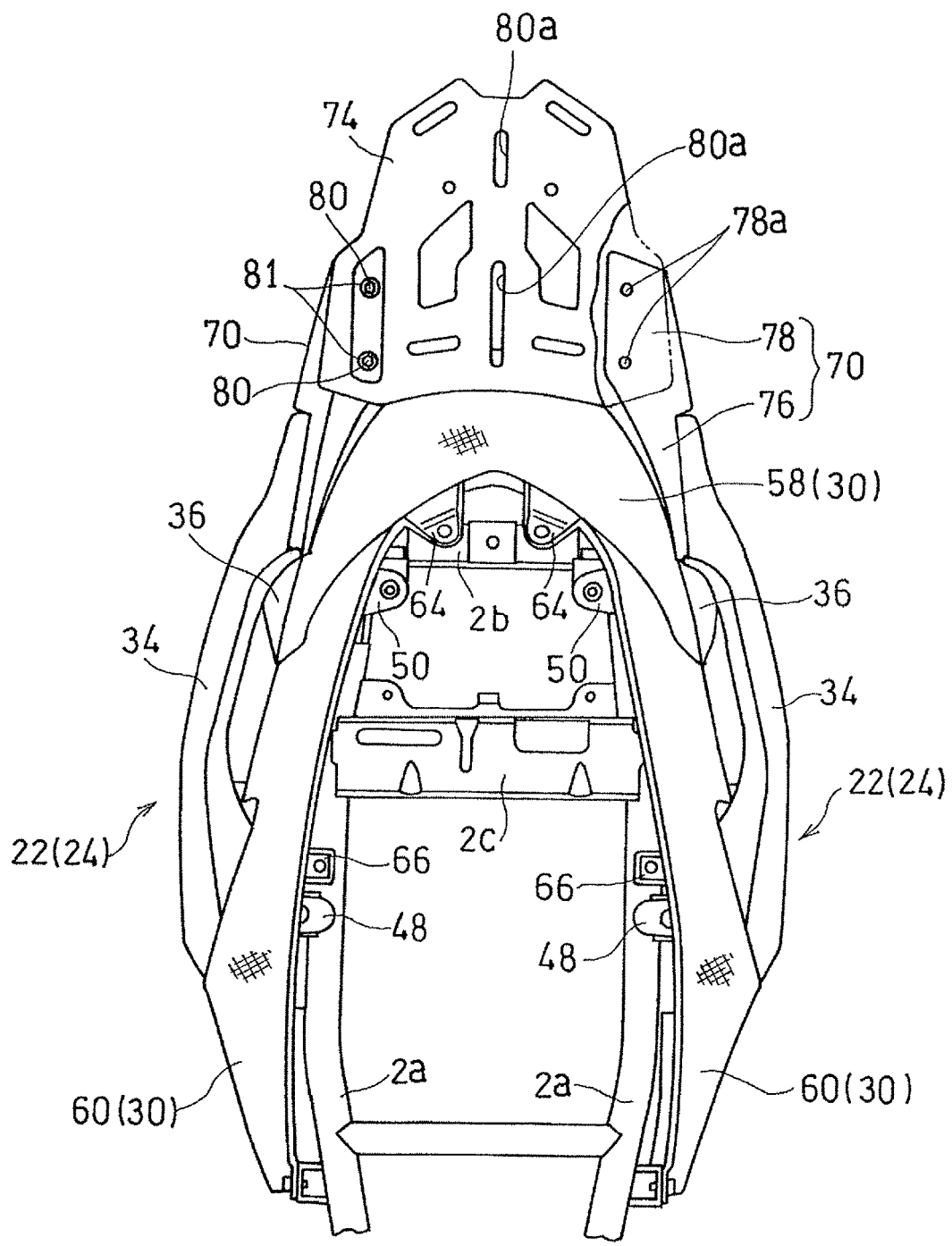
FIG. 5 is a top plan view showing the tandem grip unit with a casing stay fitted to the top plan view of FIG. 4.

FIG. 5 shows the manner in which the casing stay 70 is fitted to the top plan view of FIG. 4. As shown in FIG. 5, the casing stay 70 is provided one on each side with respect to the vehicle widthwise direction, and the casing stays 70 and 70 are of a symmetrical configuration with respect to the vehicle widthwise direction. The left and right casing stays 70 and 70 are fitted respectively to the casing fitting portions 38 and 38 of the left and right tandem grips 22. The casing stay 70 is in the form of an elongated member made of aluminum and extending in the anteroposterior direction. Each of the casing stay 70 includes a vehicle body fitting portion 76, forming a front half portion, and a casing support portion 78 forming a rear half portion.

Figure 7:
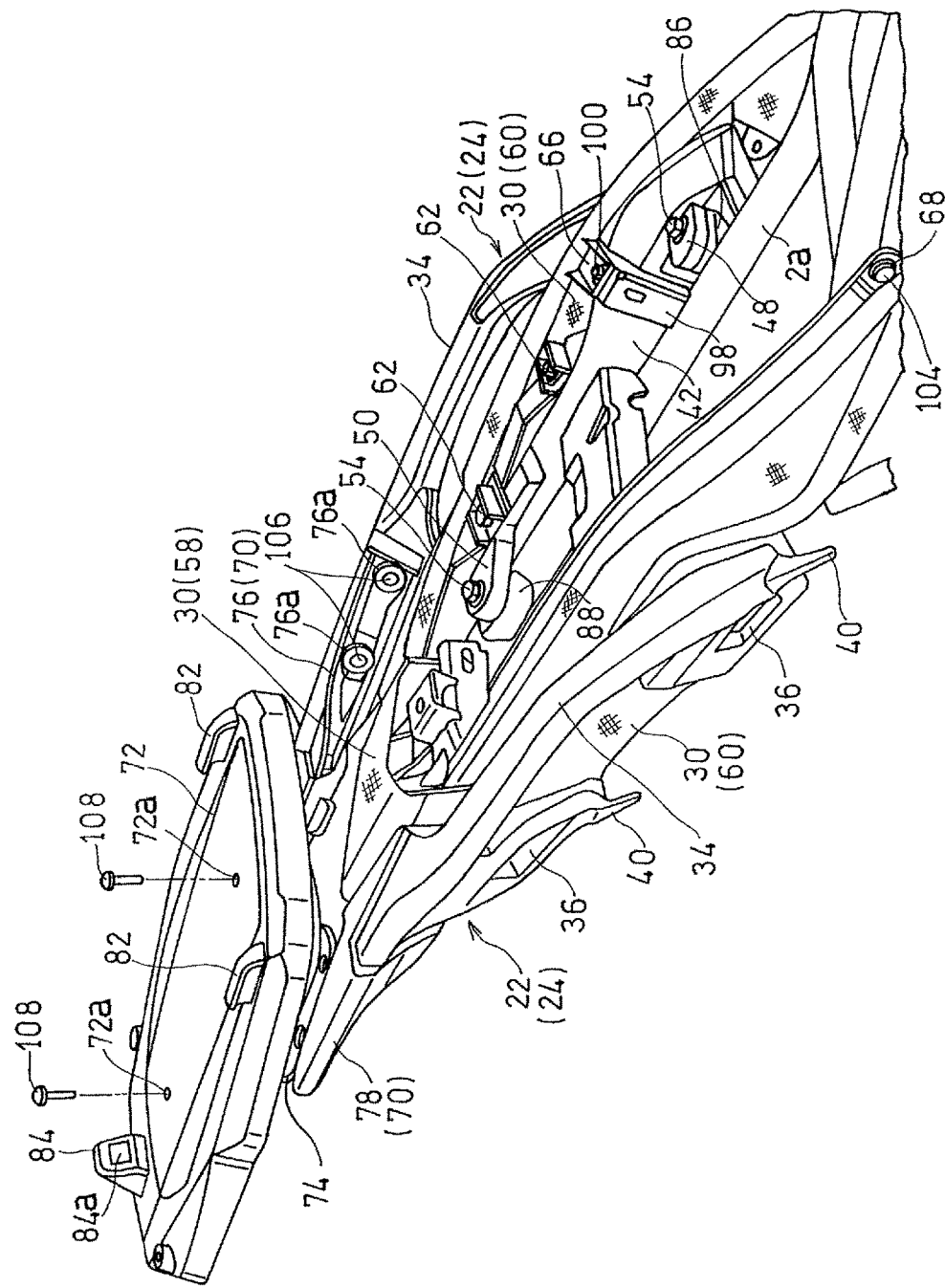
FIG. 7 is a perspective view showing the rear portion of the motorcycle.

As shown in FIG. 7, the vehicle fitting portion 76 of the casing stay 70 is formed with a bolt insertion hole 76a that is oriented in the vehicle widthwise direction. The bolt insertion hole 76a is provided at a position corresponding to the helically threaded hole 38a in the boss (casing fitting portion) 38 shown in FIG. 2, and is provided two in number with those bolt insertion holes 76a being juxtaposed in the anteroposterior direction.

As shown in FIG. 5, the casing support portion 78 in the casing stay 70 is formed with a helically threaded hole 78a oriented in the vertical direction. The helically threaded hole 78a is provided two in number one with those helically threaded holes 78a being juxtaposed in the anteroposterior direction. A pedestal 74 in the form of a metal plate is disposed on a top surface of the casing support portion 78 in the casing stay 70.

The pedestal 74 is supported by the left and right casing support portions 78 at left and right side portions thereof opposite to each other. The left and right side portions of the pedestal 74 are formed with respective bolt insertion holes 81. The bolt insertion holes 81 are formed at respective positions corresponding to the helically threaded holes 78a in the casing support portions 78, with those bolt insertion holes 81 being juxtaposed in the anteroposterior direction. The pedestal 74 is connected with the casing support portion 78 by means of a bolt 80 inserted into the corresponding bolt insertion hole 81 and then threaded into the corresponding helically threaded hole 78a. An intermediate portion of the pedestal 74 in the vehicle widthwise direction is formed with a slit 80a that extends in the anteroposterior direction. The slit 80a is formed two in number with those slits 80a being juxtaposed in the anteroposterior direction.

Figure 6:
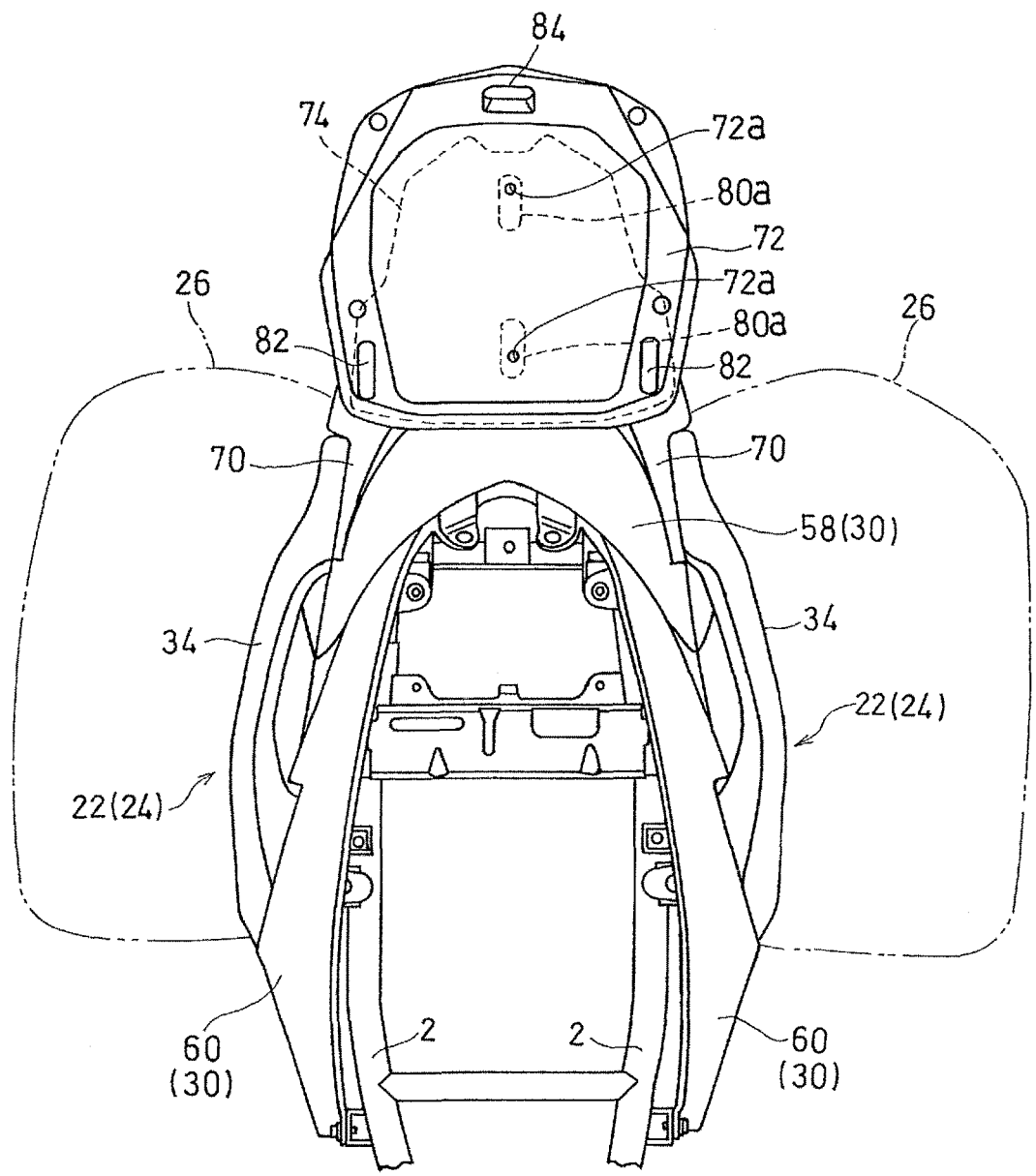
FIG. 6 is a top plan view showing the tandem grip unit with a support plate fitted to the top plan view of FIG. 5.

FIG. 6, which is a top plan view, shows the manner of fitting of the support plate 72 to the pedestal 74 shown in FIG. 5. The support plate 72 is in the form of a plate member made of a resinous material and having a generally rectangular shape when viewed in top plan view. This support plate 72 is disposed atop the pedestal 74 and is supported by the casing stay 70 through the pedestal 74.

As shown in FIG. 6, a throughhole 72a oriented in the vertical direction is formed in an intermediate portion of the support plate 72 that is situated intermediate of the vehicle widthwise direction. The throughhole 72a is formed at a position corresponding to the slit 80a in the pedestal 74 and is provided two in number with those throughholes 72a juxtaposed in the anteroposterior direction. First engagement portions 82 and 82, with which a front portion of the top casing 28 (shown in FIG. 1) is engaged, are formed on leftward and rightward side portions of a front portion of a top surface of the support plate 72. A second engagement portion 84, with which a rear portion of the top casing 28 (shown in FIG. 1) is engaged, is formed in a vehicle widthwise direction intermediate portion of a rear portion of the top surface of the support plate 72.

As shown in FIG. 7, each of the first engagement portions 82 is in the form of an upwardly protruding engagement projection, and the second engagement portion 84 has an engagement hole 84a defined therein so as to extend diagonally forwardly and upwardly. Through the first and second engagement portions 82 and 84 of any known shapes, the top casing 28 shown in FIG. 1 is engaged with and is therefore supported by the support plate 72.

Hereinafter, the manner of fitting the tandem grip unit 24, the pannier bags 26, the top casing 28 and the tail covering 30 to the rear frame 2 will be described. At the outset, the tandem grip unit 24 has to be fitted to the rear frame 2.

Specifically, as shown in FIG. 2, a first boss 86 is provided forwardly of the intermediate cross member 2c in the rear frame 2, and a second boss 88 is provided in the forward vicinity of the rear end cross member 2b in the rear frame 2. The first to-be-supported segment 48 of the tandem grip unit 24 is overlapped on the first boss 86, and the second to-be-supported segment 50 is overlapped on the second boss 88. Starting from this condition, the bolt 54 shown in FIG. 3 is inserted from above into the throughhole 48a in the first to-be-supported segment 48 and is then fastened to a screw hole (not shown) defined in the first boss 86. Similarly, the bolt 54 is inserted from above into the throughhole 50a in the second to-be-supported segment 50 and is then fastened to a screw hole (not shown) provided in the second boss 88.

Also, the bolt 56 is inserted from laterally outwardly of the vehicle body (along the vehicle widthwise direction) into the bolt insertion hole 52a in the third to-be-supported portion (boss) 52 and is then fastened to a screw hole (not shown) in a third boss 90 provided in the rear frame 2. The third boss 90 is provided laterally outwardly of the intermediate cross member 2c in the rear frame 2. By following the above described procedures, the tandem grip unit 24 comes to be supported by the rear frame 2.

After that, the tail covering 30 shown in FIG. 4 is fitted to the rear frame 2. Specifically, the tail covering 30 is inserted from rear to allow the rear to fitting piece 64 of the tail covering 30 to overlap on a fitting piece 94 (best shown in FIG. 3) provided in the rear end cross member 2b at the rear end of the rear frame 2. Starting from this condition, a bolt 96 is inserted from rear into the bolt insertion hole 64a in the rear fitting piece 64 and is then threaded into a thread hole 94a (best shown in FIG. 3) provided in the fitting piece 94 of the rear frame 2.

Thereafter, the intermediate fitting piece 66 of the tail covering 30 is overlapped on a fitting projection 98 (as shown in FIG. 2) provided in the rear frame 2. Starting from this condition, a bolt 100 is inserted from above into the bolt insertion hole 66a in the intermediate fitting piece 66 and is then fastened to a thread hole 98a (as shown in FIG. 2) provided in the fitting projection 98 of the rear frame 2. Also, a bolt 104 is inserted from laterally outside of the vehicle body into the bolt insertion hole 68 in the front end of the tail covering 30 and is then fastened to a thread hole (not shown) provided in a fitting bracket 102 in the rear frame 2. By following the above described procedures, the tail covering 30 comes to be supported by the rear frame 2.

Thereafter, the casing stay 70 and the pedestal 74, both shown in FIG. 5, are fitted to the boss (casing fitting portion) 38 in the tandem grip unit 24. Specifically, a bolt 106 shown in FIG. 7 is inserted into the bolt insertion hole 76a in the casing stay 70 from the inner side of the vehicle body and is then fastened to the helically threaded hole 38a in the boss 38. Thereby, the casing stay 70 is fitted to the tandem grip unit 24.

Following the foregoing, the pedestal 74 is overlapped on the top surface of the casing support portion 78 of the casing stay 70 shown in FIG. 5, and the bolt 80 is inserted from above into the bolt insertion hole 81 in the pedestal 74 and is then fastened to the helically threaded holt 78a in the casing stay 70. Thereby, the pedestal 74 is fitted to the casing stay 70.

Following the foregoing, the support plate 72 shown in FIG. 6 is fitted to the pedestal 74. Specifically, in a condition in which the support plate 72 is overlapped on the top surface of the pedestal 74, a bolt 108 shown in FIG. 7 is inserted from above into the throughhole 72a in the support plate 72 (FIG. 6) and then through the slit 80a (shown in FIG. 5) in the pedestal 74, followed by fastening with a nut (not shown). Thereby, the support plate 72 is fitted to the casing stay 70 through the pedestal 74.

Following the foregoing, the pannier bags 26 and the top casing 28, shown in FIG. 1, are fitted to the tandem grip unit 24. A recess (not shown) defined in a front portion of a bottom portion of the top casing 28 is engaged from rear with the first engagement portion 82 in the support plate 72 shown in FIG. 7. Starting from this condition, a projecting portion (not shown) formed in a rear portion of the bottom portion of the top casing 28 is engaged with the second engagement portion 84 in the support plate 72. Thereby, the top casing 28 shown in FIG. 1 is fitted to the support plate 72 and is supported by the rear frame 2 through the tandem grip unit 24.

Also, in a condition in which an engagement projection (not shown) provided in a top portion of the pannier bag 26 is engaged in the recess (bag fitting portion) 36 in the tandem grip unit 24 shown in FIG. 7, an engagement recess (not shown) provided in the front portion of the pannier bag 26 is supported by the step stay 20. Thereby, the pannier bags 26 are supported by the rear frame 2 through the tandem grip unit 24. It is to be noted that the engagement projection and the engagement recess in the pannier bag 26 are of a structure well known to those skilled in the art.

According to the construction hereinabove described, each of the left and right tandem grips 22 shown in FIG. 2 is a one-piece molded article comprised of the to-be-supported portion 32 supported by the rear frame 2, the grip portion 34 to be grasped by the fellow passenger, the bag fitting portion 36 to which the pannier bag 26 is fitted, and the casing fitting portion 38 to which the top casing 28 is fitted. Accordingly, without rendering the rear frame 2 to be complicated in structure, the pannier bag 26 and the top casing 28 can be fitted to the vehicle body. Also, with the to-be-supported portion 32, the grip portion 34, the bag fitting portion 36 and the casing fitting portion 38 having been formed integrally, the number of component parts can be reduced, and also the tandem grip unit 24 can be increased in size accompanied by the increase of the rigidity. As a consequence, the pannier bag 26 and the top casing 28 can be stably supported.

Also, the rope hook 40 for engaging the luggage fastening rope is also formed integrally by means of the molding technique. Accordingly, the number of component parts can be further reduced, and also, a luggage fastening element 110 and a luggage 112 placed on the fellow passenger's seat 14 can be stably supported by the tandem grip unit 24 increased in size.

In addition, since the space 69 is formed between the pair of the connecting portions 46 and 46 beneath the grip portion 34, the fellow passenger can easily grasp the grip portion 34, and also the tandem grip unit 24 can be reduced in weight.

Further, the to-be-supported portion 32 includes the first and second to-be-supported segments 48 and 50, which are fixed by the bolt 54 from the vertical direction, and the third to-be-supported segment 52 which is fixed by the bolt 56 from the vehicle widthwise direction. Therefore, the tandem grip unit of the present invention comes to be applied to a variety of motorcycle.

Yet, the grip portion 34 and bag fitting portion 36 in the tandem grip unit 24 are exposed to the outside of the tail covering 30 while the remaining portion other than those is covered from lateral outside by the tail covering 30. Accordingly, the to-be-supported portion 32 of the tandem grip unit 24 can be concealed. As a result, the appearance of the rear portion of the motorcycle can be improved, and also, the cost of manufacture of the tandem grip unit 24 can also be reduced since the to-be-supported portion 32 is not necessarily formed as a design part.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Although in the description of the preferred embodiment of the present invention as set hereinbefore, the tandem grip unit 24 has been shown and described as formed integrally with the rope hook 40, the present invention may not necessarily be limited thereto and the rope hook 40 may be a member separate from the tandem grip unit 24, in which case the rope hook 40 has to be fitted to the tandem grip unit 24 or the rear frame 2 by means of a suitable connecting means.

Accordingly, such changes and modifications are, unless they depart from the scope of the present invention as delivered from the claims annexed hereto, to be construed as included therein.

REFERENCE NUMERALS

22 ... Tandem grip
24 ... Tandem grip unit
26 ... Pannier bag
28 ... Top casing
30 ... Tail covering
32 ... To-be-supported portion
34 ... Grip portion
36 ... Bag fitting portion (Recess)
38 ... Casing fitting portion (Boss)
40 ... Rope hook
42 ... Base portion
44 ... Top portion
46 ... Connecting portion
48 ... First to-be-supported segment (First fitting piece)
50 ... Second to-be-supported segment (Second fitting piece)
52 ... Third to-be-supported segment (Boss)
70 ... Casing stay
72 ... Support plate
FR ... Vehicle frame structure

What is claimed is:

1. A tandem grip unit in a motorcycle including pair of left and right pannier bags for accommodating an article therein, removably fitted to left and right sides of a vehicle rear portion, respectively, and a top casing for accommodating another article therein removably fitted to an upper portion of the vehicle rear portion, the tandem grip unit comprising a pair of left and right tandem grips which are held by a fellow passenger, wherein
each of the tandem grips is a one-piece molded article including:
a to-be-supported portion which is supported by a vehicle frame structure;
a grip portion to be gripped by the fellow passenger;
a bag fitting portion to which the respective pannier bag is fitted;
a casing fitting portion to which the top casing is fitted;
a base portion of an elongated shape having a lengthwise direction in an anteroposterior direction of the motorcycle;
a top portion disposed above the base portion and elongated in the anteroposterior direction; and
a pair of connecting portions spaced in the anteroposterior direction and configured to extend upwardly from anteroposterior opposite end portions of the base portion to connect the anteroposterior opposite end portions of the base portion with an anteroposterior opposite end portions of the top portion,
the to-be-supported portion is formed in a surface of the base portion facing inwardly of a vehicle body,
the bag fitting portion is formed in a surface of the base portion facing outwardly of the vehicle body,
the grip portion is defined by a portion of the top portion between the pair of connecting portions, and
the casing fitting portion is formed in a rear end portion of the top portion.

2. The tandem grip unit as claimed in claim 1, further comprising a rope hook engageable with a luggage fastening rope, which hook is also formed integrally.

3. The tandem grip unit as claimed in claim 1, in which the casing fitting portion comprises a boss provided in a rear end portion of the tandem grip,
further comprising an elongated casing stay, extending in an anteroposterior direction of the motorcycle, to support the top casing, the elongated casing stay being removably fitted to the boss.

4. The tandem grip unit as claimed in claim 1, in which the to-be-supported portion comprises:
a first and second to-be-supported segments defined in front and rear end portions of the surface of the base portion facing inwardly of the vehicle body, respectively; and
a third to-be-supported segment provided in an anteroposterior direction intermediate portion of the base portion, wherein
the first and second to-be-supported segments are fixed from a vertical direction by a bolt, and
the third to-be-supported segment is fixed from a vehicle widthwise direction by a bolt.

5. The tandem grip unit as claimed in claim 4, in which the vehicle frame structure comprises a main frame forming a front half portion and a rear frame forming a rear half portion, wherein:
the rear frame comprises a pair of left and right rear frame pieces, a rear end cross member to connect respective rear end portions of the pair of the rear frame pieces, and an intermediate cross member to connect the pair of the rear frame pieces at a location forwardly of the rear end cross member;
a first boss to support the first to-be-supported segment is provided at a location forwardly of the intermediate cross member in the rear frame;
a second boss to support the second to-be-supported segment is provided in the vicinity of the rear end cross member in the rear frame; and
a third boss to support the third to-be-supported segment is provided laterally outwardly of the intermediate cross member in the rear frame.

6. A motorcycle comprising a tandem grip unit including pair of left and right pannier bags for accommodating an article therein, removably fitted to left and right sides of a vehicle rear portion, respectively, and a top casing for accommodating another article therein removably fitted to an upper portion of the vehicle rear portion, the tandem grip unit comprising a pair of left and right tandem grips which are held by a fellow passenger, wherein each of the tandem grips are a one-piece molded article including:
a to-be-supported portion which is supported by a vehicle frame structure;
a grip portion to be gripped by the fellow passenger;
a bag fitting portion to which the respective pannier bag is fitted;
a casing fitting portion to which the top casing is fitted, and
a tail covering to cover the vehicle frame from lateral outside, the tail covering being removably fitted to a rear end portion of the vehicle frame, wherein
the grip portion and the bag fitting portion in each of the tandem grips are exposed to the outside from the tail covering, whereas the remaining portion other than each of the tandem grips is covered from the lateral outside by the tail covering.

7. A motorcycle which comprises:
a tandem grip unit including a pair of left and right pannier bags for accommodating an article therein, removably fitted to left and right sides of a vehicle rear portion, respectively, and a top casing for accommodating another article therein, removably fitted to an upper portion of the vehicle rear portion, the tandem grip unit comprising a pair of left and right tandem grips which are held by a fellow passenger, wherein each of the tandem grips is a one-piece molded article including:

a to-be-supported portion which is supported by a vehicle frame structure;

a grip portion to be gripped by the fellow passenger;

a bag fitting portion to which the respective pannier bag is fitted; and a casing fitting portion to which the top casing is fitted, and the pannier bags being fitted to each of the tandem grips;

a casing stay fitted to the casing fitting portion of each of the tandem grips;

a support plate fitted between the pair of the casing stays; and the top casing supported by the support plate.

8. The motorcycle as claimed in claim 7, further comprising a tail covering to cover the vehicle frame from lateral outside, the tail covering being removably fitted to a rear end portion of the vehicle frame, wherein the grip portion and the bag fitting portion in each of the tandem grips are exposed to the outside from the tail covering, whereas the remaining portion other than each of the tandem grips is covered from the lateral outside by the tail covering.

* * * * *